United States Patent Office 3,738,992
Patented June 12, 1973

3,738,992
1-AZA-5-HYDROXYMETHYL-3,7-DIOXABICYCLO-[3.3.0]-OCTANE
John A. Frump, Terre Haute, Ind., assignor to
Commercial Solvents Corporation
No Drawing. Continuation-in-part of abandoned application Ser. No. 2,394, Jan. 12, 1970. This application Feb. 7, 1972, Ser. No. 224,270
Int. Cl. C07d 85/26
U.S. Cl. 260—307 F      3 Claims

ABSTRACT OF THE DISCLOSURE

Bicyclic oxazolidine esters corresponding to the formula

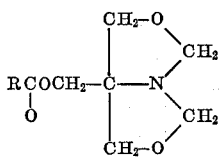

where R is an alkyl or alkenyl radical of from 8 to 17 carbon atoms. The compounds are useful in lubricant compositions and as anti-foam agents.

CROSS-REFERENCE TO RELATED APPLICATIONS

This application is a continuation-in-part of U.S. Ser. No. 2,394, filed Jan. 12, 1970, and now abandoned.

BACKGROUND OF THE INVENTION

This invention relates to bicyclic oxazolidine esters. In a particular aspect, it relates to fatty acid esters of 1-aza-5-hydroxymethyl-3,7-dioxabicyclo-[3.3.0]-octane which compound is, for convenience, referred to as a bicyclic oxazolidine.

The synthesis of substituted bicyclic oxazolidines, including the 5-hydroxymethyl derivative, was disclosed by Wm. B. Johnston in U.S. Pat. 2,448,890. It was also disclosed that the oxazolidines could be reacted with unsaturated fatty acids in a 1:3 mole ratio to produce drying oils, but during the reaction, the ring structure was ruptured, and one mole of formaldehyde was released.

SUMMARY OF THE INVENTION

It is the object of this invention to provide bicyclic oxazolidine esters.

It is another object of this invention to provide fatty acid esters of 1-aza-5-hydroxymethyl-3,7-dioxabicyclo-[3.3.0]-octane.

Other objects of this invention will be apparent to those skilled in the art from the disclosure herein.

It has been surprisingly discovered that compounds corresponding to the formula

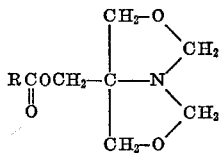

where R is an alkyl (or alkenyl) radical of from 8 to 21 carbon atoms can be prepared by reacting 1-aza-5-hydroxymethyl-3,7-dioxabicyclo-[3.3.0]-octane (hereinafter designated oxazolidine-T) with a fatty acid in a 1:1 mole ratio without rupturing the ring structure. These compounds are good anti-foam agents and in addition possess excellent lubricity which makes them useful in the formulation of lubricant compositions, especially textile lubricants.

DETAILED DISCUSSION

The oxazolidine-T esters of the present invention are readily prepared by esterification with a fatty acid corresponding to the formula RCOOH where R has the same meaning as hereinbefore set forth.

The esterification process is conducted essentially in accordance with known methods. The oxazolidine-T is reacted with the fatty acid in about a 1:1 mole ratio. The water of esterification produced in the reaction is separated by distillation. The remaining product can be used as is or it can be further refined by recrystallization from a suitable solvent, e.g. hot methanol. Preferably the esterification is conducted in the presence of a suitable azeotrope-former with water, such as benzene, toluene or xylene, preferably benzene.

The oxazolidine-T which forms one of the raw materials in the preparation of the esters of the present invention can be prepared by the method of Wm. B. Johnston, U.S. Pat. 2,448,890, which is incorporated herein by reference thereto. It is also available commercially from Commercial Solvents Corporation, New York, N.Y., 10017, under the designation "Oxazolidine-T." The commercial grade is suitable for the practice of this invention.

The fatty acids suitable for forming the esters of the present invention are those having from 9–22 carbon atoms and can be saturated or unsaturated. The saturated acids are generally preferred. Suitable acids include perargonic, decanoic, lauric, myristic, palmitic, stearic, and behenic of the saturated acids. Suitable unsaturated acids include oleic.

The formulation of textile lubricant compositions is known to those skilled in the art and the lauric and other esters can be readily formulated according to known methods. Generally, the ester-oxazolidine is dispersed or dissolved in a suitable carrier, e.g. water or a glycol, or it can be prepared as an emulsion. When the products of the present invention are to be used as anti-foam agents, they are conveniently dissolved or dispersed in a suitable liquid, e.g. benzene, toluene, or xylene, in a concentration of about 1–10% or more and sprayed directly on the foaming liquid. They are especially useful in the manufacture of low-foaming household detergents by incorporating the ester with the detergent mixture at the time of manufacture. Generally, 1–2% by weight provides the desired results.

The invention will be better understood by reference to the following examples. These examples are presented for purposes of illustration only, and it is not intended that the invention be limited thereby.

EXAMPLE 1

Oxazolidine-T, 145 g. (1 mole) was charged to a one-liter flask equipped with an agitator, thermometer and a decanter head mounted on an 18″ Vigreaux distillation column. Lauric acid, 200 g. (1 mole) and 15 ml. benzene were added and the mixture was heated to 185° C. for 2 hours after which time the esterification was judged to be complete as indicated by removal of about 1 mole of water. The benzene was removed by distillation and the product was allowed to cool.

The crude product was a red-brown liquid having a neutralization equivalent of 359.2. The infrered spectrum was consistent with that of an oxazolidine having an ester linkage (absorption peak at 1735 cm.$^{-1}$).

A portion of the crude oxazolidine ester was recrystallized from methanol yielding a white crystalline product having the following properties:

|  | Found | Expected |
|---|---|---|
| Neutral equivalent | 341 | 327 |
| Acid number | 2.9 | None |
| Saponification number | 166.3 | 171 |
| N, percent | 4.16 | 4.28 |
| C, percent | 66.07 | 66.0 |
| H, percent | 9.97 | 10.1 |
| Melting point, °C | 33-34 | |

The infrared absorption spectrum and the nuclear magnetic resonance spectrum were consistent with expected compound.

The lauric acid ester was applied by melting the ester oxazolidine and mixing wtih a typical household laundry detergent at a concentration of 2% by wt. A 5 g. sample of the treated detergent was dissolved in 2.5 liters of deionized water in a 10-liter stainless steel beaker. The solution was strongly agitated with a Premier Mill Dispersator, causing the foam to rise to 6.5 in. When the test was repeated with the untreated detergent, the foam rose to 9.5 inches. Thus the oxazolidine-T laurate ester provided good foam control, but permitted the low foam desirable in a home laundry detergent.

This compound is insoluble in water but in the presence of water it has excellent lubricity. It is effective in textile spinning operations and in a pad bath such as used in chemical finishing of textiles. In these applications it is emulsified in water using an emulsifying agent.

EXAMPLE 2

The experiment of Example 1 was repeated except that stearic acid, 1 mole, was substituted for lauric acid. The crude product was a tan wax. The product having the following properties was determined to be suitable for use without purification.

|  | Found | Expected |
|---|---|---|
| Neutral equivalent | 445 | 408 |
| Acid number | 30.3 | |
| Saponification number | 133.52 | 137 |
| N, percent | 3.13 | 3.43 |
| C, percent | 69.66 | 70.5 |
| H, percent | 10.70 | 11.03 |

The crude ester was practically insoluble in hot and cold water; it was soluble in hot methanol and hot acetone but only slightly soluble in cold methanol and cold acetone; it was soluble in both hot and cold benzene. The infrared absorption spectrum was consistent with the expected compound.

A 2% by weight solution in xylene is prepared. It is sprayed on the surface of a foaming liquid in an amount of about 0.1% of ester based on the volume of the liquid. The foam rapidly subsides to a low level.

EXAMPLE 3

The experiment of Example 1 is repeated except that pelargonic acid, 1 mole, is substituted for lauric acid. The crude product obtained thereby was a red-brown liquid suitable for use without refining. It had the following properties:

|  | Found | Expected |
|---|---|---|
| Neutral equivalent | 298 | 285 |
| Acid number | 41.9 | |
| Saponification number | 161 | 196 |
| N, percent | 4.68 | 4.92 |
| C, perdent | 63.81 | 63.3 |
| H, percent | 9.84 | 9.48 |

The product is insoluble in water but like the lauric ester, it has excellent lubricity in the presence of water. It has utility as a lubricant in textile spinning operations.

EXAMPLE 4

The experiment of Example 1 is repeated except that oleic acid, 1 mole, is substituted for lauric acid. The product obtained thereby is useful as an anti-foam agent and possesses good lubricity making it useful in lubricant compositions.

I claim:

1. A bicyclic oxazolidine ester corresponding to the formula

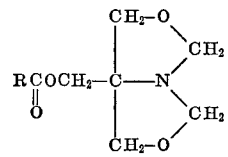

where R is an alkyl or alkenyl radical of from 8 to 17 carbon atoms.

2. The composition of claim 1 wherein R is an alkyl radical having 17 carbon atoms.

3. The composition of claim 1 wherein R is an alkyl radical having 8 carbon atoms.

References Cited

UNITED STATES PATENTS 3,256,137  6/1966  Danielson _____ 161—241

ALEX MAZEL, Primary Examiner

R. V. RUSH, Assistant Examiner

U.S. Cl. X.R.

252—49.5, 358